United States Patent [19]
Devin et al.

[11] 3,840,431
[45] Oct. 8, 1974

[54] SUBMARINE NUCLEAR REACTOR

[75] Inventors: Bernard Devin, Gif-Sur-Yvette; Gerard Dupuy; Jean-Pierre Schwartz, both of Paris, all of France

[73] Assignee: Commissariat a l'Energie Atmonique, Paris, France

[22] Filed: Apr. 3, 1972

[21] Appl. No.: 240,594

[52] U.S. Cl................ 176/39, 136/202, 310/3, 310/4, 176/87
[51] Int. Cl............................................. G21c 3/40
[58] Field of Search................ 176/39, 87; 310/4, 3; 136/202

[56] References Cited
UNITED STATES PATENTS

| | | | |
|---|---|---|---|
| 3,118,818 | 1/1964 | Bray | 136/202 |
| 3,262,820 | 7/1966 | Whitelaw | 176/39 |
| 3,455,781 | 7/1969 | Leffert | 176/39 |
| 3,534,202 | 10/1970 | Schutt | 310/4 |
| 3,537,910 | 11/1970 | Zogran et al. | 176/39 |
| 3,547,778 | 12/1970 | Flaherty et al. | 176/39 |
| 3,687,804 | 8/1972 | Mills et al. | 176/39 |

Primary Examiner—Leland A. Sebastian
Assistant Examiner—Roger S. Gaither
Attorney, Agent, or Firm—Cameron, Kerkam, Sutton, Stowell & Stowell

[57] ABSTRACT

The submarine reactor comprises a core made up of fuel elements, elements for the control of reactivity, and stacks of thermionic diodes in which each stack is surrounded by an inert gas envelope and the emitter of each diode contains fissile material.

The reactor core is placed within a single cooling circuit surrounded by a biological shield casing which is provided with means for automatic temperature regulation and for balancing the pressure of coolant fluid contained therein with the pressure of the surrounding sea water.

7 Claims, 5 Drawing Figures

SUBMARINE NUCLEAR REACTOR

This invention relates to the production of electric power from a submarine nuclear power source.

It is known that the energy released by the nuclear fission of uranium appears in the form of heat which is usually converted to electric power by means of rotating machines.

Although installations of this type are operated without difficulty in free air, it is extremely difficult if not actually impossible to contemplate their use under conditions of total submersion in sea water, especially on account of the problems presented under these conditions of service by the operation, supervision and maintenance of rotating machines.

The primary object of the present invention is to overcome these difficulties by permitting direct conversion of nuclear energy to electric power by means of a reactor which is adapted to the conditions created by an underwater medium.

The invention is directed to a submarine nuclear reactor comprising a core constituted by a plurality of stacks of thermionic diodes in which the emitter of each diode contains fissile material and also by a plurality of fuel elements. The submarine reactor is distinguished by the fact that the reactor core is placed within a single cooling circuit comprising means for automatically regulating the temperature and for maintaining the pressure equal to that of the surrounding sea water, said circuit being at least partially surrounded by a biological shield casing provided with means for ensuring that the liquid contained therein is at the same pressure as the surrounding sea water with which the external walls of said casing are in contact, that the thermionic diodes are surrounded by an inert gas envelope, and that said reactor comprises elements for controlling the reaction.

Thermionic diodes are known per se. These diodes have the property of producing electric current having high intensity at low voltage when they are placed within a high neutron flux and the charge of uranium or a uranium compound contained in the emitter of each of said diodes contributes to said neutron flux. Although these devices will be referred-to in this description as thermionic diodes, they are also known by such terms as thermoelectric diodes, plasma diodes or even thermodiodes.

The electric connection between diodes of any one stack and between each stack and the other stacks are clearly a function of the characteristics on the one hand of the current to be delivered and on the other hand of the diodes employed. In the majority of cases, it will be found necessary to adopt series-parallel connections for the complete assembly of diodes.

The mechanical coupling as well as electric connections between the diodes of each stack can be carried out in particular by welding said diodes to each other.

In order to maintain the diodes at the high temperatures at which they exhibit optimum operating characteristics, each stack of said diodes is advantageously separated thermally from the remainder of the reactor core by an inert gas envelope which constitutes a thermal barrier around the stack. Preferably, each of these envelopes is defined by a pressure tube providing a connection between two chambers located respectively above and beneath the reactor core and containing an inert gas of the same type such as helium, for example.

Said chambers also perform the function of collectors for the gaseous fission products produced by the emitter of each diode.

In order to ensure reactivity control, the reactor comprises, in accordance with a well-known arrangement, at least one neutron-absorbing element which can be contained to a greater or lesser extent within the peripheral portion of the reactor core and can even be brought momentarily into a position in which it is fully withdrawn from said reactor core.

In accordance with a usual technique, the reactivity control means can be operated by servomechanisms actuated from a central control station to which are supplied in particular the information relating to the progress of the reaction as controlled by neutron detectors.

In accordance with further arrangements of the invention, the heat-transporting fluid of the primary circuit is capable of transferring heat to sea water either directly or by means of the fluid contained within a second casing and constituting a biological shield.

The biological shield casing can, in addition:

either cooperate with the primary circuit while being hydraulically connected thereto, the circulation of the coolant fluid from one to the other being adjustable;

or be separated hydraulically from the reactor-core cooling means.

In the case especially in which the fuel elements of the peripheral portion of the reactor core cannot withstand a temperature as high as that of the diodes of the central portion of said core, the reactor advantageously comprises means whereby the heat-transporting fluid which is circulated within the reactor core is caused to pass first through the peripheral portion alone of the reactor core, then through the central portion alone of said core.

This last-mentioned arrangement can in particular be combined with the arrangement in which the biological shield casing and the primary circuit contain one and the same fluid, the circulation of said fluid from one to the other being controlled.

In order to overcome the effects of pressure variations within the cooling circuit in which the fluid transfers heat directly to the sea water or within the biological shield casing, said circuit advantageously comprises a pressure-regulating device which can in particular be a diaphragm-type device or more simply a siphon.

A better understanding of the invention will be gained from the following description and from the accompanying drawings in which a number of embodiments of the reactor in accordance with the invention are illustrated by way of non-limitative example, and in which.

Figure 1:
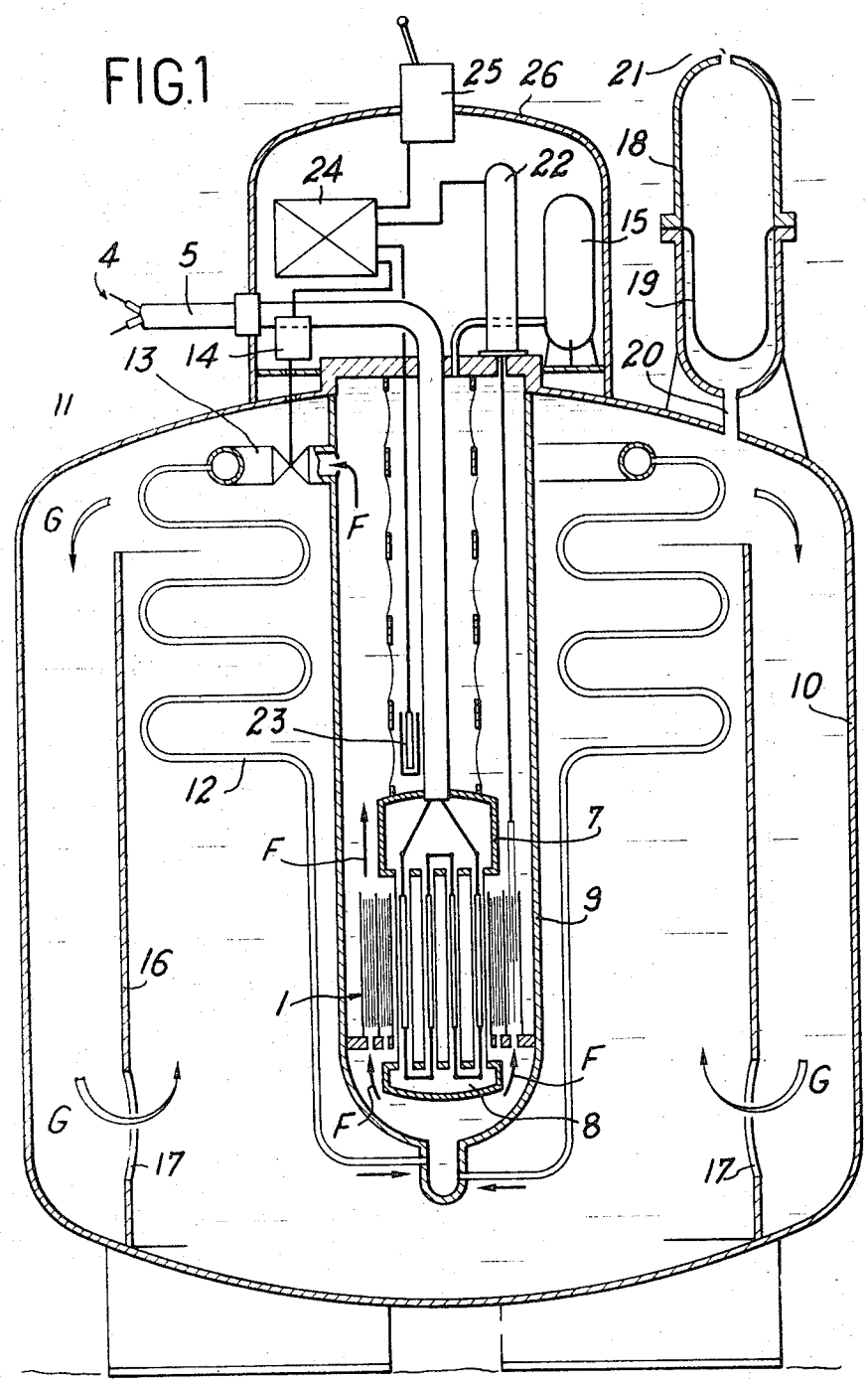
FIG. 1 is a diagrammatic sectional front view of a first embodiment of the reactor in accordance with the invention.
Figure 2:
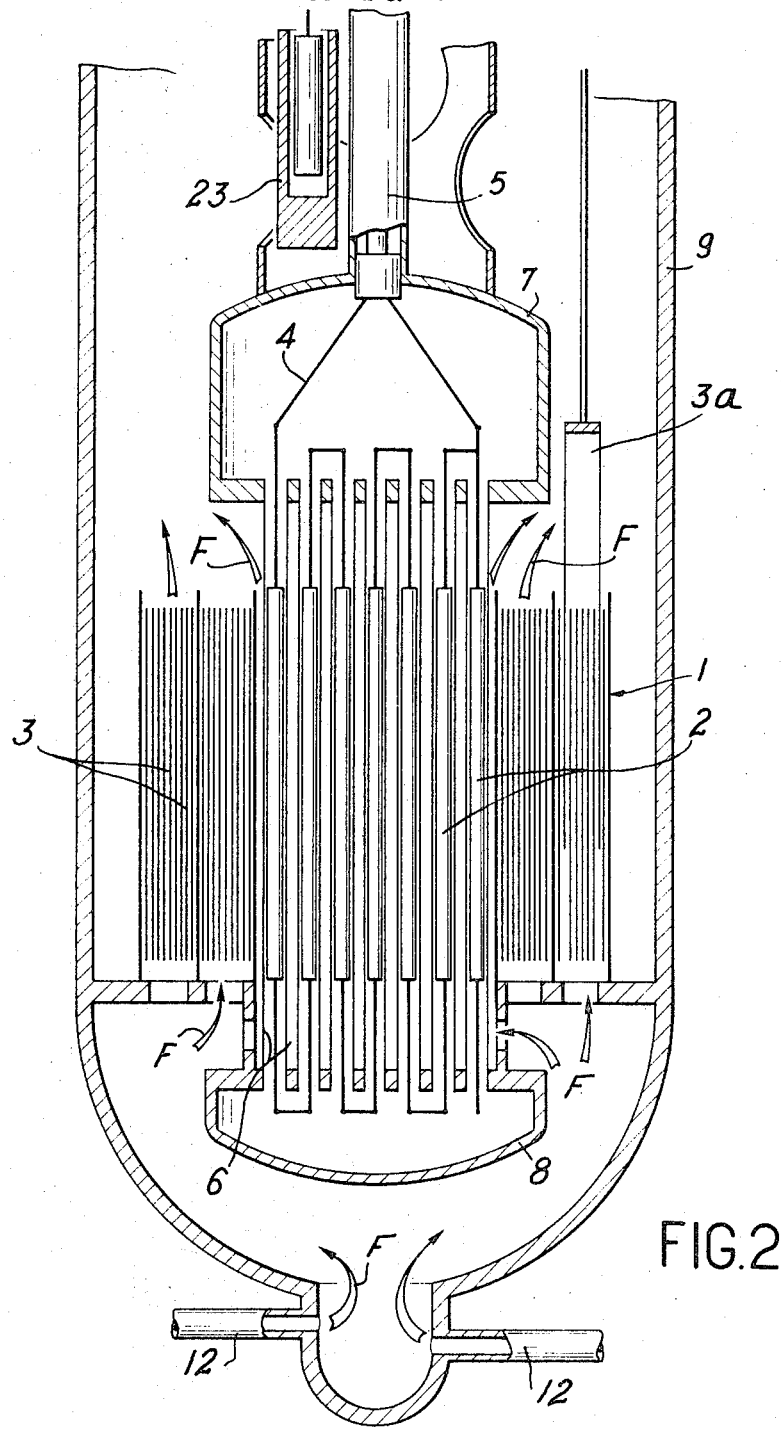
FIG. 2 is a partial detail view of the reactor of FIG. 1.

The reactor in accordance with the invention as illustrated in FIGS. 1 and 2 essentially comprises a core 1, the central portion of which is constituted by a plurality of stacks 2 of thermionic diodes which are welded to each other and each having an emitter containing uranium which takes part in the chain reaction suitable thermionic diodes for use herein are disclosed in U.S. Pat. Nos. 3,329,839; 3,327,141; 3,454,979; and 3,455,781. The peripheral portion of said reactor core being constituted by a plurality of fuel elements 3 of known type such as plate elements, for example.

The thermionic diodes of each stack 2 are connected electrically to each other and the stacks 2 are connected to each other by means of conductors 4 so as to deliver an electric current having predetermined characteristics to a cable 5 which provides a connection between the diodes and a utilization circuit (not shown). Each stack 2 is contained within a pressure tube 6 for putting into communication two chambers 7 and 8 located respectively above and beneath the reactor core 1. The pressure tubes 6 and the chambers 7 and 8 contain an inert gas such as helium which surrounds each stack 2 and forms a thermal barrier around each of said stacks. The reactor core 1 considered as a whole is contained within a first tank or casing 9, said casing being in turn contained within a second tank or casing 10 which is immersed in the sea water 11.

There is established within the casing 9 an upward circulation of heat-transporting fluid which passes through the reactor core 1 and the flow paths of which are indicated by the arrows F. By means of a heat exchanger 12 in which the circulation of the heat-transporting fluid is controlled by a valve 13 having a servomechanism 14, said fluid transfers the heat removed from the core 1 to another fluid which is contained within the second biological shield casing 10 and which in turn transfers its heat to the sea water 11.

The first reactor casing 9 and the heat exchanger 12 define with a device 15 for pressurizing the heat-transporting fluid, a cooling circuit in which the heat-transporting fluid circulates by natural convection. The second heat-transporting fluid consists of water and also circulates by natural convection within the second biological shield casing 10, the circulation of said second fluid (as illustrated by the arrows G in FIG. 1) being directed within said casing 10 by an annular deflector 16 which is coaxial with this latter and pierced in the vicinity of its lower extremity with flow orifices 17. The water which is guided by the deflector 16 flows upwards within the central portion of the casing 10 around the heat exchanger 12 and returns downwards at the periphery of said casing 10 while being cooled along the wall of this latter.

A pressure regulating device 18 comprising a diaphragm 19 and adapted to communicate on one side of said diaphragm 19 at 20 with the internal volume of said second casing 10 and on the other side of said diaphragm at 21 with the sea water 11, serves to balance the internal pressure within the second casing 10 with the pressure of the surrounding sea water 11.

In addition to the foregoing, the reactor of FIGS. 1 and 2 comprises:

means for controlling the reactivity and constituted by neutron-absorbing elements located in the peripheral zone of the core and operated by servomechanisms 22 for maintaining the assembly at the desired power level and by neutron detectors 23 which provide the user at each instant with information relating to the progress of the reaction;

a central information and control station 24 to which are connected the servomechanisms 14 of the valve 13, the neutron detectors 23 and the servomechanisms 22 for the neutron-absorbing elements, the function of said station being to carry out and control the adequate operations of the valve 13 and of the absorbing elements;

manual reactor-control means 25 located above the reactor and accessible from the exterior of a casing 26 which surrounds the electronic monitoring and control units 14–15–22–24 of the reactor.

Figure 3:
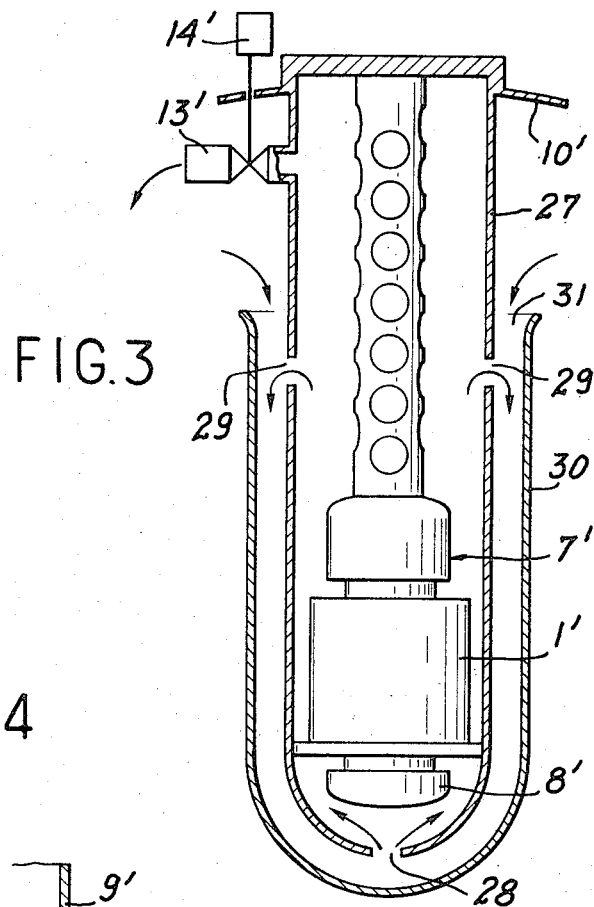
FIG. 3 is a partial view of a first alternative embodiment of the reactor of FIGS. 1 and 2.
Figure 4:
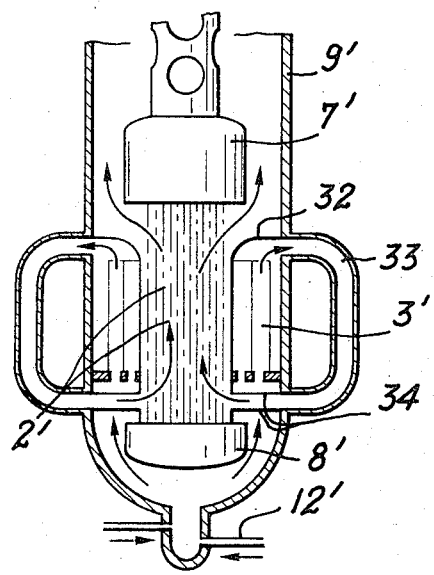
FIG. 4 is a partial view of a second alternative embodiment of the reactor of FIGS. 1 and 2.

In the alternative embodiments of FIGS. 3 and 4, the same references as those employed in FIG. 1 but followed by the prime index have been employed to designate identical or similar elements.

In the alternative embodiment of FIG. 3, the reactor differs from that of FIGS. 1 and 2 only in the fact that the reactor core 1' is supported by a first casing 27 which is made integral with the second casing 10' and pierced below the level of the reactor core 1' by a bottom orifice 28 and above said level by upper orifices 29 and that a deflector 30 having a solid wall substantially parallel to that of the first casing surrounds this latter to a partial extent, the opening 31 of the said deflector being located above the level of the upper orifices 29 of the first casing.

In this alternative embodiment, the cooling circuit is defined by the first casing 27 and the deflector 30 and contains the same heat-transporting fluid as the second biological shield casing 10', namely water. The temperature around the reactor core 1' is regulated by mixing with the water which circulates around the reactor core 1', a controlled quantity of water at a lower temperature which is contained within the second casing 2.

The hot water which surrounds the reactor core 1' passes out through the first casing 27, on the one hand into the casing 10' through the valve 13' to the servomechanism 14', on the other hand through the upper orifices 29 into the space delimited around the casing 27 by the deflector 30, from which the hot water returns through the orifice 28 into the casing 27 while carrying with it a quantity of cold water corresponding to the flow which escapes through the valve 13' and passes through the opening 31 of the deflector. By controlling the delivery of the valve 13', there is admitted into the coolant-water circuit of the reactor core the quantity of cold water which is necessary for obtaining a predetermined temperature. The circulation of water around the reactor core is carried out by means of a thermo-siphon phenomenon, the water being hotter within the casing 27 at the level of the core than within the space formed between said casing and the deflector 30.

In the alternative embodiment shown in FIG. 4, the reactor differs from the embodiment of FIGS. 1 and 2 only in the deflecting means 32–33–34 which serve to provide a hydraulic separation between the central portion of the reactor core (consisting of diodes 2') and the peripheral portion of said reactor core (consisting of fuel elements 3'), and to convey the heat-transporting fluid successively through the peripheral portion of the core, then through the central portion thereof. These deflecting means can be partly located outside the casing 9' and thus increase the surface area for heat exchange with the biological shield casing 10. This arrangement, which can any case be adopted in combination with that of FIG. 3, makes it possible in particular to cool the fuel elements 3' to a greater extent than the stacks of diodes 2.

Figure 5:
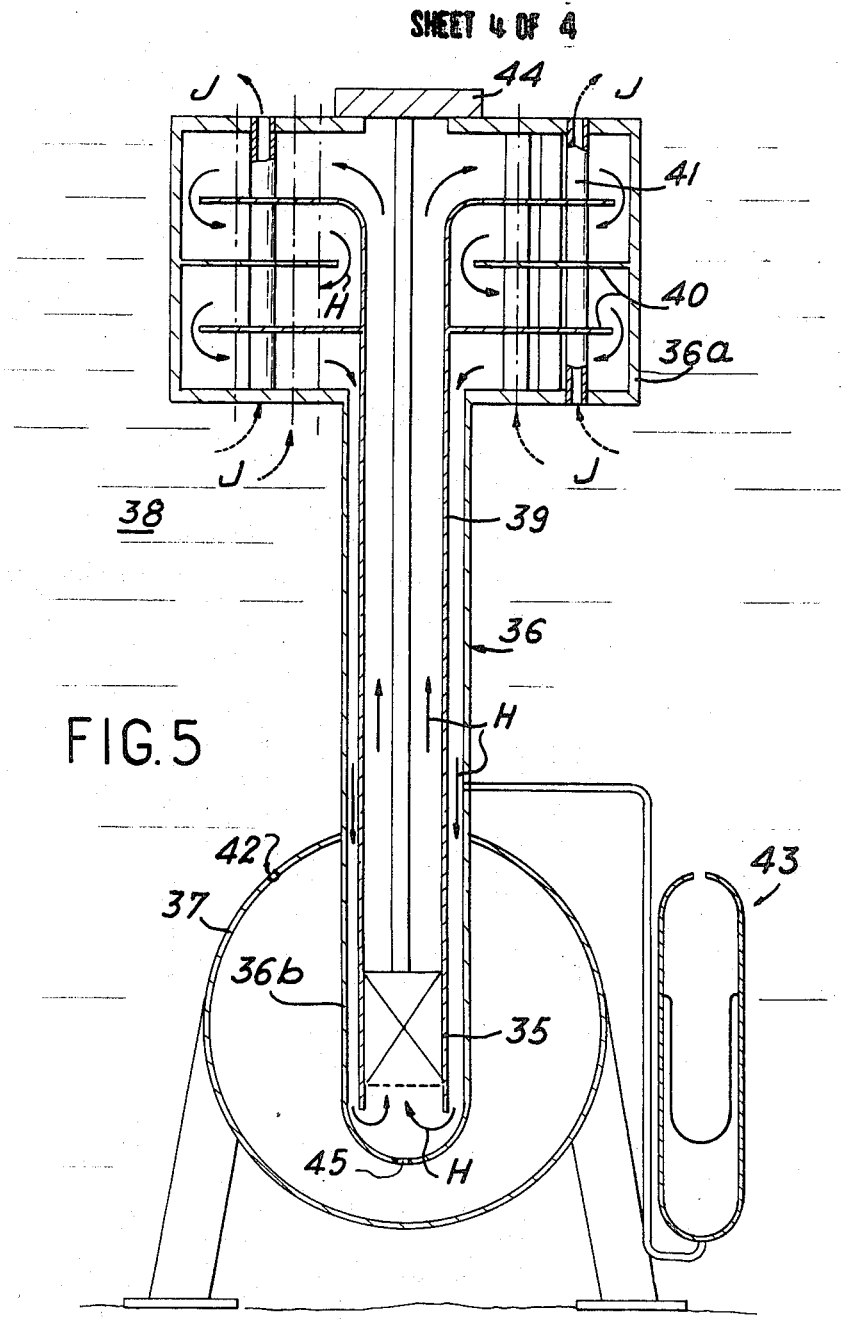
FIG. 5 is a partial diagrammatic and sectional front view showing a second embodiment of the reactor according to the invention.

In the embodiment of FIG. 5, the reactor core 35 (which is similar to the core shown in FIGS. 1 and 3) is contained within a tubular casing 36 having a widened top portion 36a, the bottom portion 36b of said tubular casing being located within a substantially spherical casing 37 which defines the biological shield of the reactor core, the complete assembly being immersed in sea water 38.

Longitudinal partition-walls and transverse partition-walls 39 define with the tubular casing 36 a primary coolant circuit in which the heat-transporting fluid such as water, for example, is caused to flow by natural convection within the casing 36 along the paths indicated by the arrows H. The partition-wall 39 can be heat-insulated with a view to promoting natural convection of the coolant. In order to increase the heat-transfer surface between the primary circuit and the sea water 38, the widened top portion 36a of the casing 36 is traversed parallel to its longitudinal axis by a plurality of ducts 41 which permit circulation of sea water by natural convection through said widened portion 36a of the casing 36, the direction of flow being indicated by the arrows J.

In order that pressure equilibrium may be established between the internal volume of the casing 37 when sea water is employed as biological shielding and the external sea water 38, the casing 37 is pierced by an orifice 42 and the cross-sectional area chosen for said orifice is sufficiently small to prevent an excessive flow rate of radioelements from said casing into the sea water. Biological shielding can also be provided by light water contained within the casing 37; in this case, pressure equilibrium with the sea water can be established by the diaphragm regulator 43 by means of an orifice 45 formed in the base of the casing 36b which is thus in communication with the casing 37. It is apparent that no provision is made for the orifice 42 in this case.

In the embodiment of FIG. 5, a pressure regulator 43 of the same type balances the pressure between the internal volume of the tubular casing 36 and the sea water 38.

The reactor of FIG. 5 is additionally provided either wholly or in part with monitoring and control elements such as those shown in FIG. 1, namely neutron detectors 23, a valve 13 with servo-control unit 14, neutron-absorbing elements and servo-control means 22 for said elements, a device 15 for pressurizing the primary fluid, an information and control station 24, manual reactor-control means 25 not shown in FIG. 5 but designed to be positioned within the reactor of this figure, on the support plate 44 which is located at the top portion of said reactor.

In this embodiment, the direct heat transfer between the fluid and the sea water 38 as well as the pressure-balancing means permit the use of thin, lightweight structures which are therefore inexpensive to produce and are practically not subject to any stress, thereby enhancing operational safety. As in the case of FIGS. 1 and 2 and alternative forms of construction, this reactor permits ready removal of all noble materials, and especially of monitoring and control means, from the fixed structures which can in turn be recovered indefinitely. With this objective, the assembly of noble materials is suspended from the support plate 44 by means of a structure and the transverse cross-sectional area of this assembly is slightly smaller than that of the longitudinal partition-wall 39.

Furthermore, in order to guard against corrosion, the walls which are in contact with the sea water can advantageously be fabricated from titanium.

It is readily apparent that the present invention is not limited solely to the modes of application which have been described by way of explanation and without any implied limitation but extends to all alternative forms.

We claim:

1. A submarine nuclear reactor comprising a core constituted by a plurality of stacks of thermionic diodes in which the emitter of each diode contains fissile material and also by a plurality of fuel elements, wherein said reactor core is placed within a single cooling circuit comprising means for automatically regulating the temperature and for maintaining the pressure equal to that of the surrounding sea water, said circuit being at least partially surrounded by a biological shield casing provided with means for ensuring that the liquid contained therein is at the same pressure as the surrounding sea water with which the external walls of said casing are in contact, wherein the thermionic diodes are surrounded by an inert gas envelope, said reactor being provided with elements for controlling the reaction and located respectively above and beneath the reactor core, two leak-tight chambers containing the same inert gas and connected to each other by means of at least two pressure tubes each containing one of the stacks of thermionic diodes.

2. A nuclear reactor as claimed in claim 1, comprising means for causing the heat-transporting fluid which is circulated within the reactor core to pass first through the peripheral portion alone of said core and then through the central portion of said core.

3. A nuclear reactor as claimed in claim 1, wherein the primary circuit and the biological shield casing are in hydraulic communication and contain the same fluid which is circulated from one to the other in an adjustable manner.

4. A nuclear reactor as claimed in claim 1, comprising a tubular casing provided internally with a coaxial partition-wall adapted to accommodate the reactor core at one end thereof and connected to a heat exchanger at the other end thereof, said tubular casing being connected to one of the compartments of a diaphragm-type regulator while the other compartment thereof is in communication with the sea water which constitutes the surrounding medium, that end of said casing which contains the reactor core being surrounded by a spherical biological shield casing which communicates with the surrounding medium through at least one calibrated orifice, the wall of said shield casing being in contact with the surrounding medium, the heat-transporting fluid contained within the tubular casing being circulated between the reactor core and the heat exchanger through the axial orifice of the tubular casing and through the hollow wall thereof, the central portion of said tubular casing being in contact with the surrounding medium.

5. A nuclear reactor as claimed in claim 4, wherein the reactor core and its peripheral elements are suspended from a support plate which serves as a reactor cover by means of a support structure, and wherein the transverse cross-sectional area of the reactor core is smaller than that of the internal tubular partition-wall.

6. A nuclear reactor as claimed in claim 4, wherein the heat exchanger is of the parallel plate type and traversed by a plurality of ducts located at right angles to said plates and adapted to transport sea water.

7. A nuclear reactor as claimed in claim 1, comprising a tubular casing provided internally with a coaxial partition-wall adapted to accommodate the reactor core at one end thereof and connected to a heat exchanger at the other end thereof, said tubular casing being connected to one of the compartments of a diaphragm-type regulator while the other compartment thereof is in communication with the sea water which constitutes the surrounding medium, that end of said casing which contains the reactor core being surrounded by a spherical biological shield casing which communicates with the tubular casing through at least one orifice formed at the bottom portion of said casing, the wall of said shield casing being in contact with the surrounding medium, the heat-transporting fluid contained within the tubular casing being circulated between the reactor core and the heat exchanger through the axial orifice of the tubular casing and through the hollow wall thereof, the central portion of said tubular casing being in contact with the surrounding medium.

* * * * *